A. HEITHECKER.
VALVE FOR FLUID PRESSURE REGULATORS.
APPLICATION FILED APR. 14, 1915.
1,172,596.
Patented Feb. 22, 1916.
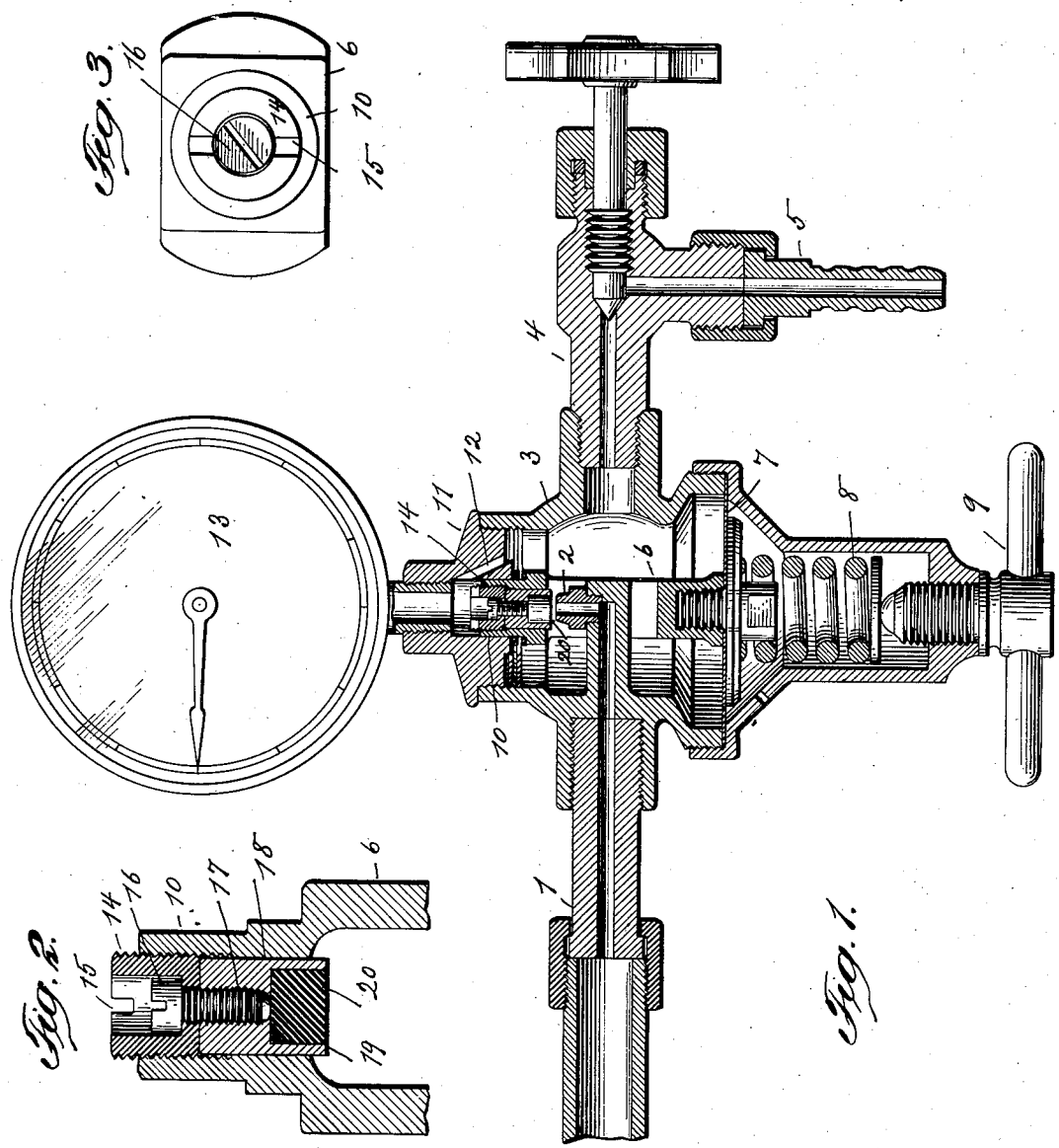
WITNESS
INVENTOR
August Heithecker
BY
Briesen & Gumpe
ATTORNEYS.

UNITED STATES PATENT OFFICE.

AUGUST HEITHECKER, OF BROOKLYN, NEW YORK.

VALVE FOR FLUID-PRESSURE REGULATORS.

1,172,596.  Specification of Letters Patent.  Patented Feb. 22, 1916.

Application filed April 14, 1915. Serial No. 21,192.

*To all whom it may concern:*

Be it known that I, AUGUST HEITHECKER, a citizen of the United States, and a resident of Brooklyn, in the county of Kings and State of New York, have invented certain new and useful Improvements in Valves for Fluid-Pressure Regulators, of which the following is a specification.

This invention relates to an improved construction of a valve for fluid pressure regulators, more particularly designed for charging fountains and similar containers with gas. A regulator of this kind is more fully described in Letters Patent No. 595540 issued to me December 14, 1897, and to which reference is hereby made for a better understanding of the general principles underlying my invention. As described in that patent the nozzle through which the gas is emitted into the regulator casing is controlled by a valve, which is in turn controlled by an elastic diaphragm, subjected to the gas pressure, so that as the pressure increases, the valve is correspondingly closed, to shut off the gas.

It is the object of the present invention, to so improve the construction of this valve, that it will work true at all times, and not be liable to assume an objectionable tilt to the axis of the nozzle, whereby a proper closure of the latter would be prevented.

In the accompanying drawing: Figure 1 is a longitudinal section of a fluid pressure regulator provided with a valve embodying my invention; Fig. 2 a section through the valve and adjoining parts, and Fig. 3 a top view of the yoke.

As more fully described in Patent 595540 hereinbefore referred to, the gas is admitted from inlet 1, and nozzle 2 into the interior of casing 3, from whence it flows by outlet 4 and nipple 5 into the fountain to be charged. Within casing 3 there is contained a yoke 6, secured to a diaphragm 7, which is acted upon by a spring 8, the tension of which may be regulated by hand screw 9. Yoke 6 is furnished with an upper tubular extension 10, which is guided within a screw cap 11 threaded into casing 3, and provided with a by pass 12, leading to a pressure gage 13. Within the upper threaded portion of the bore of tubular extension 10, there is tapped a nut 14 having nicks 15 by means of which it may be adjusted. From this nut there is suspended by its counter-sunk head 16, a screw 17 the thread of which engages loosely the thread of an axially bored cylindrical plug 18. This plug engages the lower smooth portion of the bore in tubular extension 10 and is provided at its lower face with a cavity 19 within which is accommodated a valve 20, located directly opposite nozzle 2 and operating in conjunction therewith, to control the volume of gas admitted to casing 3.

In use the gas flowing through nozzle 2 into casing 3, will exert a pressure on diaphragm 7, and flow through nipple 5 into the fountain. As the latter is being filled the pressure will rise in casing 3, and thus the diaphragm will be deflected to draw down the yoke and the valve.

When it is desired to regulate the play of the valve, nut 14 is turned, to correspondingly raise or lower plug 18 by screw 17. During this operation, the plug will always be guided in a true rectilinear direction owing to the engagement of its outer cylindrical surface with the smoothly bored inner surface of extensions 10 any slight play that might be necessary to obtain this rectilinear movement being permitted by reason of the loose engagement of screw 17 with the thread of the plug. It will be seen that by the construction described, the valve will always occupy a position in axial alinement with that of the nozzle so that the outflow of the gas is always absolutely true. So also any binding of the parts during adjustment owing to some slight inaccuracy in construction, or to an untrue screw thread is effectively obviated.

I claim:

A valve for fluid pressure regulators comprising a casing, an inclosed gas nozzle, a yoke movably mounted within the casing and having an upper threaded tubular extension, a diaphragm controlling the yoke, a nut tapped into the upper portion of the tubular extension, a screw suspended from the nut, a plug carried by the screw and slidably engaging the lower portion of the tubular extension, and a valve secured to the plug and coacting with the nozzle.

AUGUST HEITHECKER.